United States Patent [19]

Gilmour

[11] 4,050,518
[45] Sept. 27, 1977

[54] BEACH CLEANING APPARATUS

[76] Inventor: Richard C. Gilmour, 207 Weymouth Ave., Scullville, N.J. 08330

[21] Appl. No.: 701,587

[22] Filed: July 1, 1976

[51] Int. Cl.$^2$ .................................... A01D 15/02
[52] U.S. Cl. .................................... 171/116; 171/63; 171/98
[58] Field of Search .................... 171/63, 64, 65, 84, 171/85, 86, 95–98, 111, 112, 116, 121, 124–126, 135, 144

[56] References Cited

U.S. PATENT DOCUMENTS

| | | | |
|---|---|---|---|
| 2,419,154 | 4/1947 | O'brien | 171/98 |
| 3,010,523 | 11/1961 | Gifford | 171/63 |
| 3,142,341 | 7/1964 | DeBiasi | 171/136 |
| 4,014,390 | 3/1977 | Teixeira | 171/124 |

Primary Examiner—Russell R. Kinsey

[57] ABSTRACT

A beach cleaning apparatus comprises a forward assembly operatively connected to a trailer member, the forward assembly having a body portion rollably supported on a pair of spaced wheels and adapted for connection to a towing vehicle. A vertical member rotatable about a vertical axis extends upwardly from the body portion and has a rearwardly extending lever arm assembly pivotably secured thereto for movement about a horizontal axis. A winch on the forward assembly is connected to the lever arm assembly for effecting pivotal movement thereof. The free ends of the lever arm assembly are connected to the forward end of the trailer member, which consists of a rectangular container having a bed which comprises an interchangeable screen member adjacent its forward end and an interchangeable ground engaging blade member extending outwardly of the forward end. The trailer member is rollably supported on a pair of spaced wheels at the rear thereof, with the winch and lever arm assembly effecting vertical movement of the forward end thereof. A rotating brush extends transversely of the trailer member intermediate the blade member and screen member for driving sand and debris onto the screen member.

11 Claims, 11 Drawing Figures

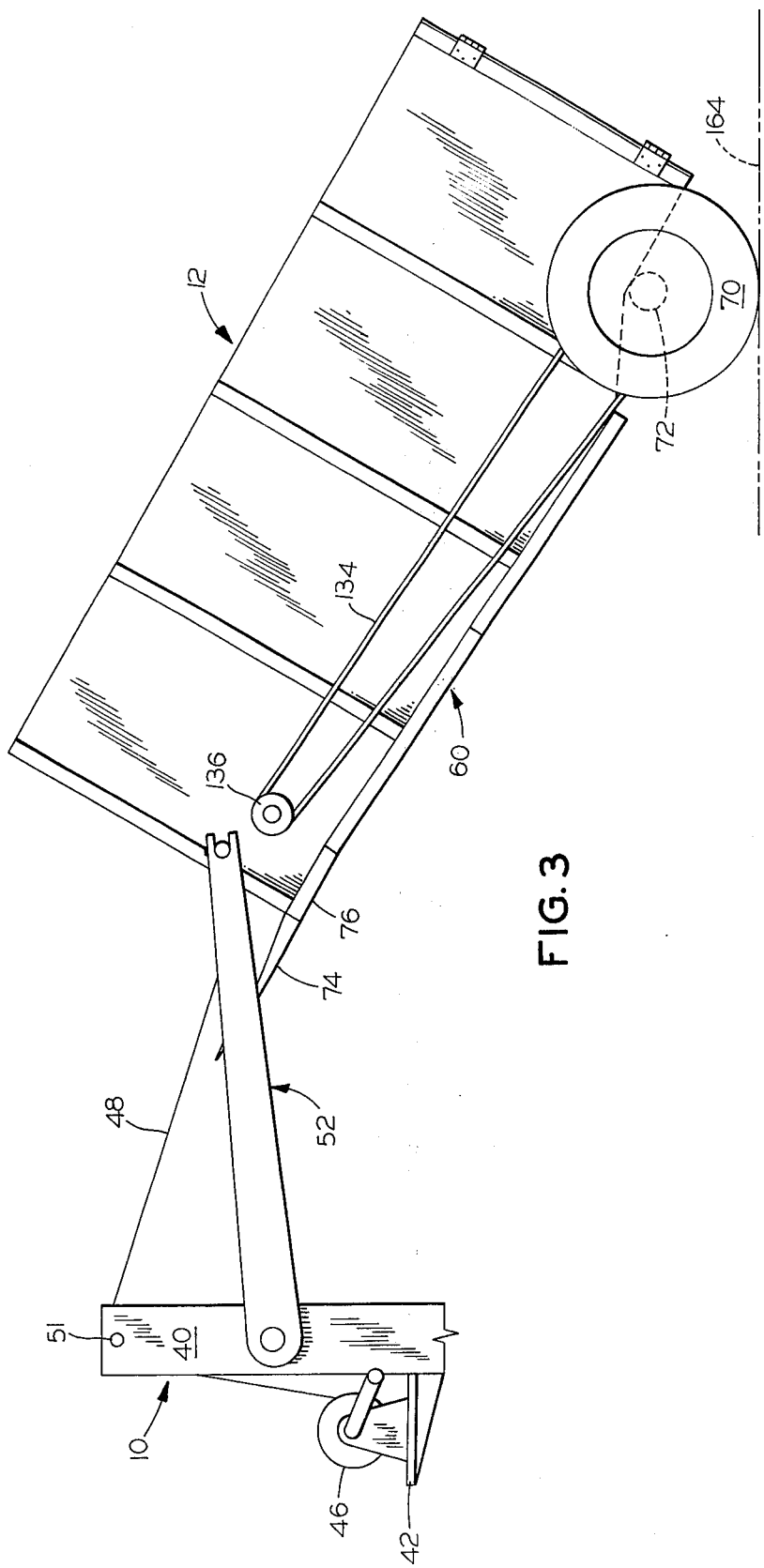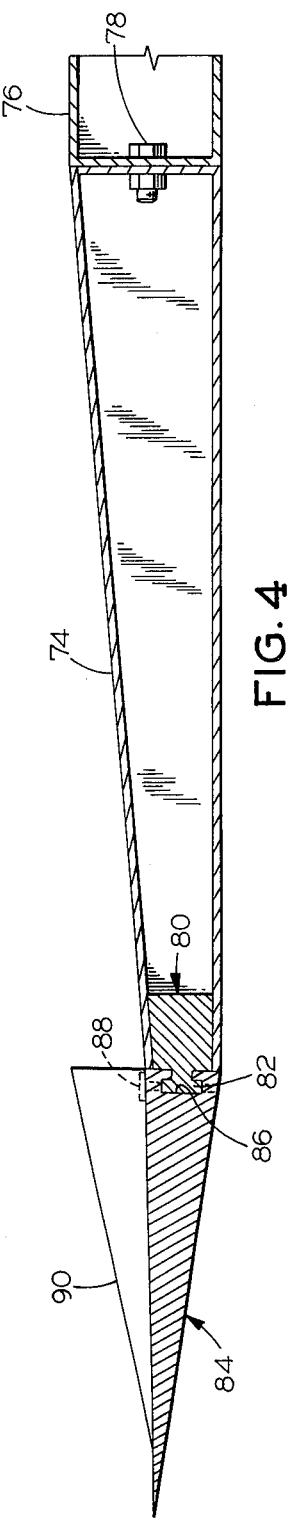

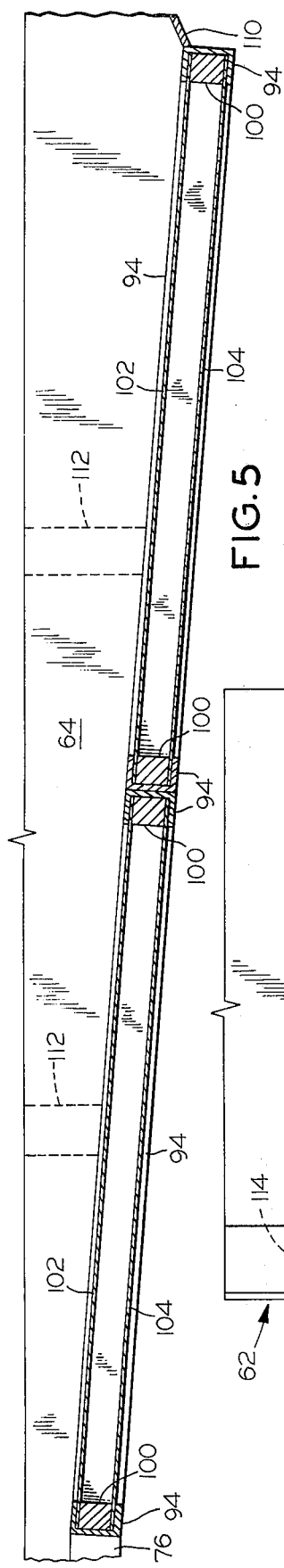
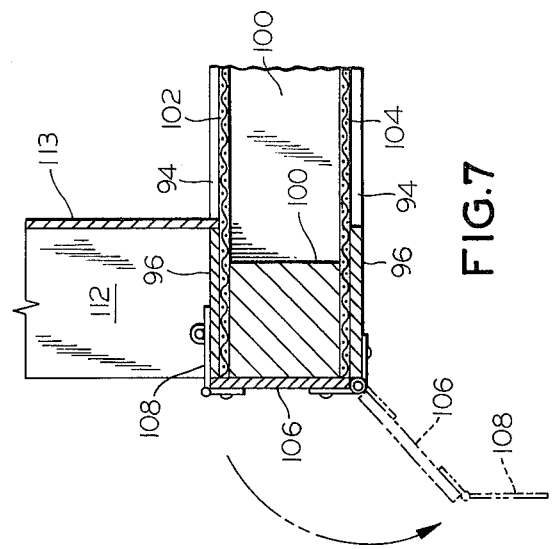
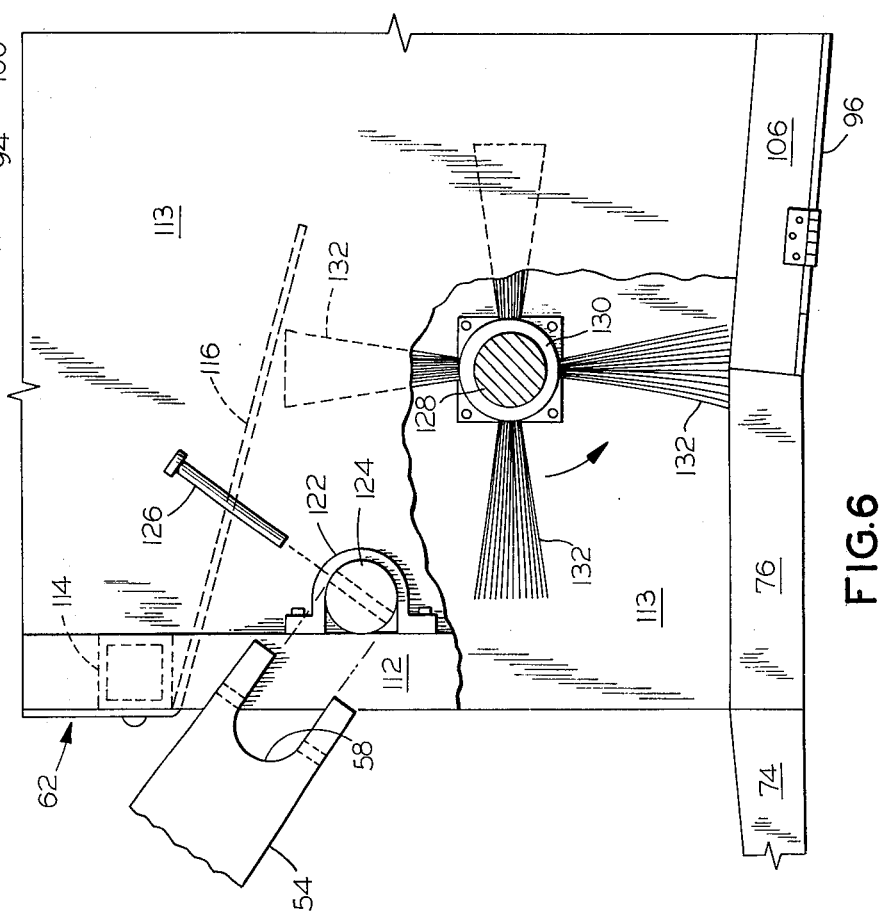

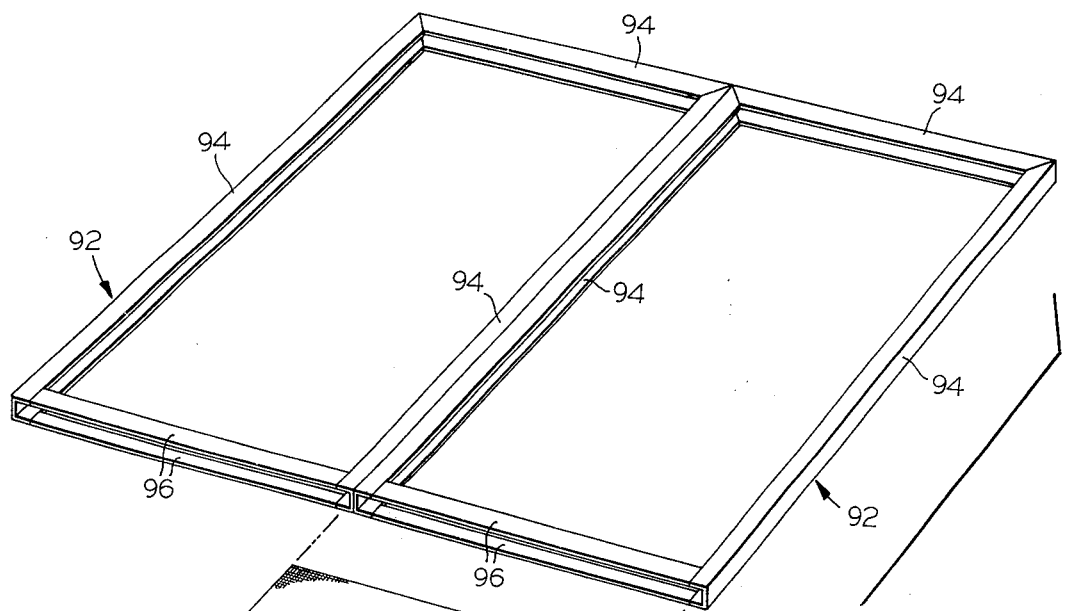
FIG. 8
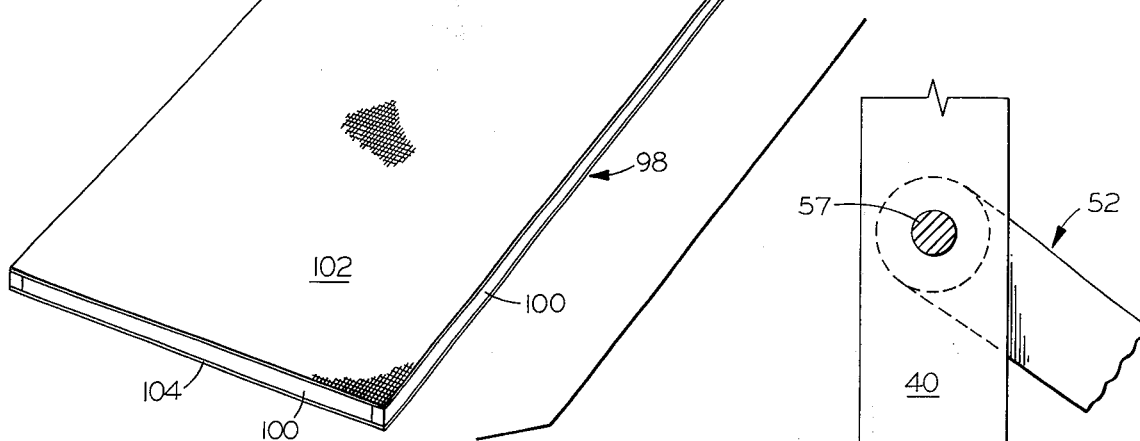
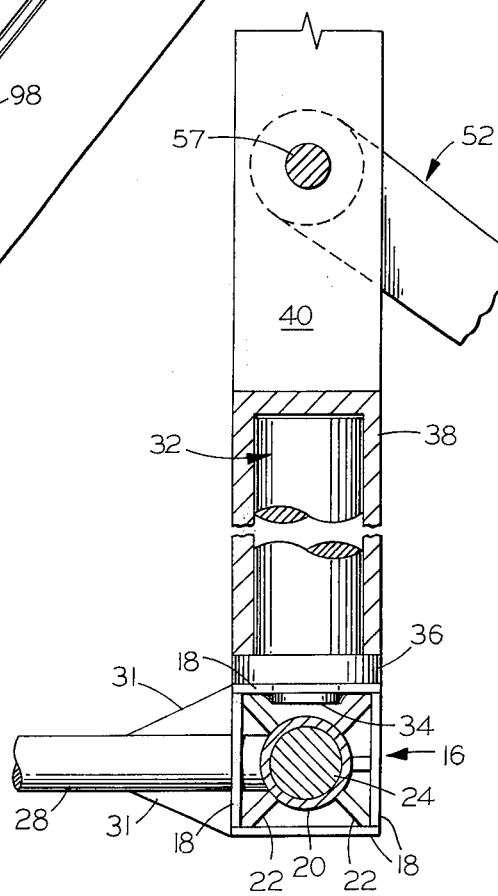
FIG. 9
FIG. 10

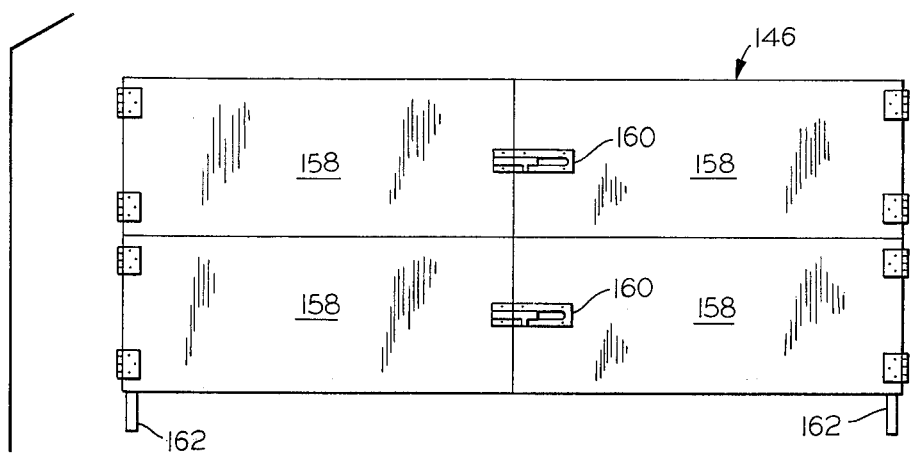
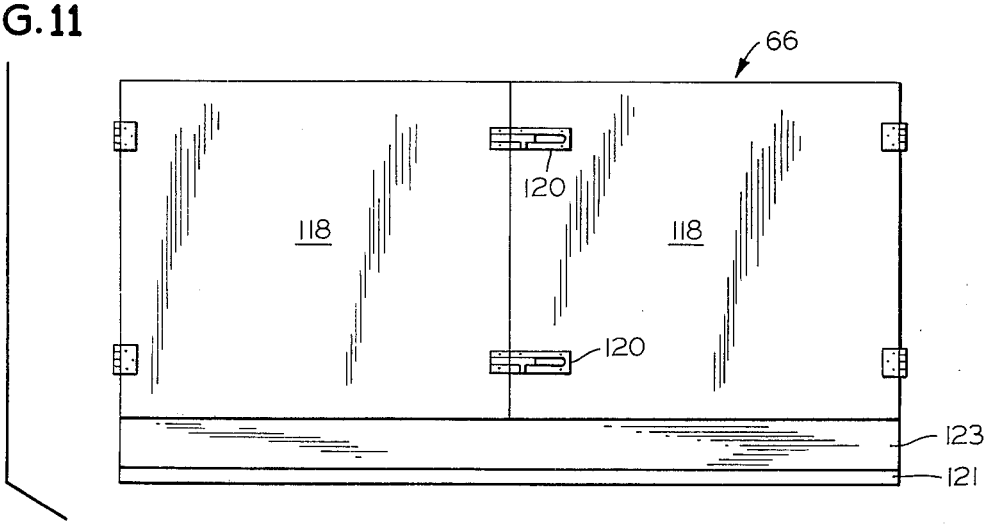
FIG.11

BEACH CLEANING APPARATUS

BACKGROUND OF THE INVENTION

The problem of collecting litter and debris scattered on beaches is just as severe as in virtually all public locations, perhaps more so as bathers and sunbathers generally carry lunches and beverages to the beach and/or have access to snack bars which proliferate adjacent public beaches. The fact that for a variety of reasons this litter often becomes buried under a layer of sand complicates the problem of collection, and renders manual cleaning all the more costly.

Prior art devices designed for removing debris from beaches are generally self-propelled and relatively complex with the corresponding increase in cost. Illustrative of such devices are the beach cleaning vehicles of U.S. Letters Pat. No. 3,596,717 granted to Valdemar Knudsen on Aug. 3, 1971 and U.S. Letters Pat. No. 3,621,919 granted to Rudolph Olson on Nov. 23, 1971.

Accordingly, it is an object of the present invention to provide a novel beach cleaning apparatus which is easily and relatively inexpensively manufactured and durable in operation.

It is also an object to provide such an apparatus wherein the elements which undergo the most wear are readily interchangeable.

Another object is to provide such an apparatus wherein the ground engaging member is automatically uncoupled from the drive vehicle upon contacting a massive or relatively immovable object.

SUMMARY OF THE INVENTION

It has now been found that the foregoing and related objects of the present invention are readily attained in a beach cleaning apparatus comprising a forward assembly and a trailer member operatively connected thereto, the forward assembly comprising a body portion, means on the forward portion of the body portion for securing the beach cleaning apparatus to a motorized vehicle, and first rotatable means extending transversely of the body portion for rollably supporting the forward assembly on the ground. The trailer member consists of a bed having a screen assembly adjacent the forward end thereof and having a ground engaging blade member extending outwardly of the forward end. Upstanding walls about the periphery of and are mounted to the bed with the lower edge of the wall portion disposed adjacent the forward end of the bed bed being spaced upwardly therefrom to provide a transversely extending opening. Second rotatable means extend transversely of the rear portion of the trailer member for rollably supporting the trailer member on the ground. A lift assembly operatively interconnects the forward portion of the trailer member to the forward assembly for raising and lowering the forward portion of the trailer member to disengage and engage the ground engaging blade member with sand to be cleaned whereby engaged sand passes over the blade member as the beach cleaning apparatus moves forwardly, through the opening and onto the screen assembly where it undergoes a sifting action to remove debris therefrom, the sand thereafter passing downwardly through the screen assembly onto a beach or the like.

In the preferred aspect, the lift assembly comprises a vertical member extending upwardly from and mounted on the body portion intermediate the width thereof, an elongated lever arm member pivotally mounted at one end thereof to the vertical member at a point spaced upwardly from the body portion for pivotal movement about a horizontal axis, an elevating member on the forward assembly operatively connected to the lever arm member for effecting pivotal movement thereof, and securing means on the other end of the lever arm member for pivotably securing the other end to the forward portion of the trailer member for relative pivotal movement about a horizontal axis. The vertical member is rotatably mounted for rotation about a vertical axis. The securing means includes force sensitive means releasably securing the other end of the lever arm member to the trailer member whereby the trailer member is disengaged from the lever arm member when the ground engaging blade member contacts a relatively massive or anchored member.

Also in the preferred aspect, the trailer member has a rotatable brush extending transversely thereof rearwardly of and adjacent the opening, the circumferential edges of the brush contacting the bed during rotation thereof whereby sand and debris passing through the opening is engaged by the brush and driven rearwardly thereof onto the screen assembly. The brush is rotated by a belt interconnecting the second rotatable means to the brush.

A door is provided in one of the walls of the trailer member to provide access to the interior thereof. The screen assembly comprises a rectangular screen member slidably seated in and extending between spaced parallel channel members in the bed. The ground engaging blade member comprises a member generally coplanar with and releasably secured to the forward portion of the bed. This member extending across the width of the trailer member and tapering to a reduced vertical dimension at the forward end thereof. A bin member is seated atop the trailer member and comprises a solid base having the same peripheral configuration as the portion of the bed circumscribed by the walls thereof. Upstanding wall members extend about the periphery of the base, and means are provided for releasably coupling the bin member to the trailer member.

BRIEF DESCRIPTION OF THE DRAWINGS

FIG. 3 is a fragmentary side elevational view of the apparatus of FIG. 2 with the forward portion of the trailer member in an elevated position;

FIG. 4 is a sectional view of the blade member and forward portion of the bed of the trailer member along the line 4—4 of FIG. 1 drawn to an enlarged scale;

FIG. 5 is a fragmentary vertical sectional view of the trailer member showing the screen assemblies thereof drawn to an enlarged scale relative to FIG. 1;

FIG. 6 is a fragmentary side elevational view of the lower forward portion of the trailer member and the yoke with portions broken away and in broken line to show internal structure with the shaft supporting the brushes in vertical section and drawn to an enlarged scale relative to FIG. 5;

FIG. 7 is a vertical sectional view of the lower lateral portion of the trailer member with phantom lines showing the open position of a retainer strip which maintains the screen assembly within the supporting channels and drawn to an enlarged scale relative to FIG. 6;

FIG. 8 is a partially exploded perspective view of the screen assemblies drawn to an enlarged scale relative to FIG. 1;

FIG. 9 is a partially exploded perspective view of a corner of a screen member of FIG. 8 drawn to an enlarged scale relative thereto;

FIG. 10 is a fragmentary vertical sectional view of the forward assembly drawn to an enlarged scale relative to FIG. 1; and FIG. 11 is an exploded rear elevational view showing the door assemblies of the trailer member and bin.

DETAILED DESCRIPTION OF THE ILLUSTRATED EMBODIMENT

Turning now to the attached drawings in detail, illustrated therein is a beach cleaning apparatus comprising a forward assembly generally designated by the numeral 10 operatively connected to a trailer member generally designated by the numeral 12 which has a bin member generally designated by the numeral 14 detachably seated thereatop.

Figure 1:
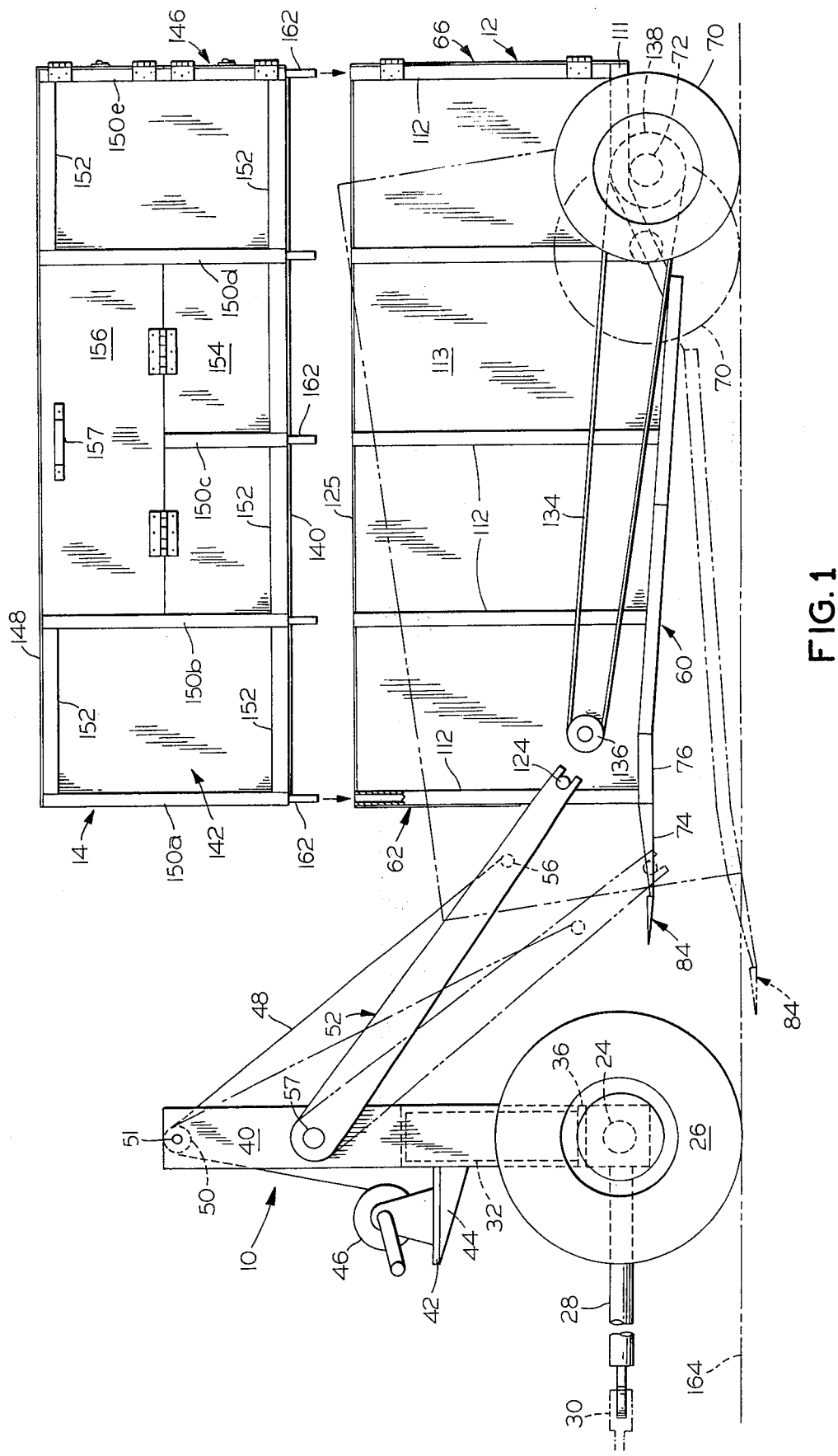
FIG. 1 is a partially exploded side elevational view of the beach cleaning apparatus of the present invention with portions broken away and in broken line to show internal structure, and with a lowered position of the trailer member shown in phantom line.

As shown best in FIGS. 1 and 10, the forward assembly 10 includes a horizontally extending body portion generally designated by the numeral 16 which consists of four rectangular plates 18 secured in a square cross-sectional configuration and a cylindrical tubular member 20 supported therewithin by five webs 22 extending between the tubular member 20 and interior surfaces of the body portion 16. The tubular member 20 functions as an axle support for an axle 24 rotatably seated therewithin by bearings (not shown) with wheels 26 being secured to opposite ends of the axle 24. The wheels 26 are of extra width to facilitate travel over sand.

With reference to FIG. 10, a solid cylinder generally designated by the numeral 32 extends upwardly from the upper plate 18 of the body portion 16 and has a lower portion 34 of lesser diameter extending through the top plate 18 and welded thereto. A bearing ring 36 seats about the lower portion of the cylinder 32 in abutment with the upper plate 18 to provide a low friction mount for a cylindrical sleeve member 38 rotatably seated about the cylinder 32, the lower edge of the sleeve member 38 seating on the bearing ring 36.

Figure 2:
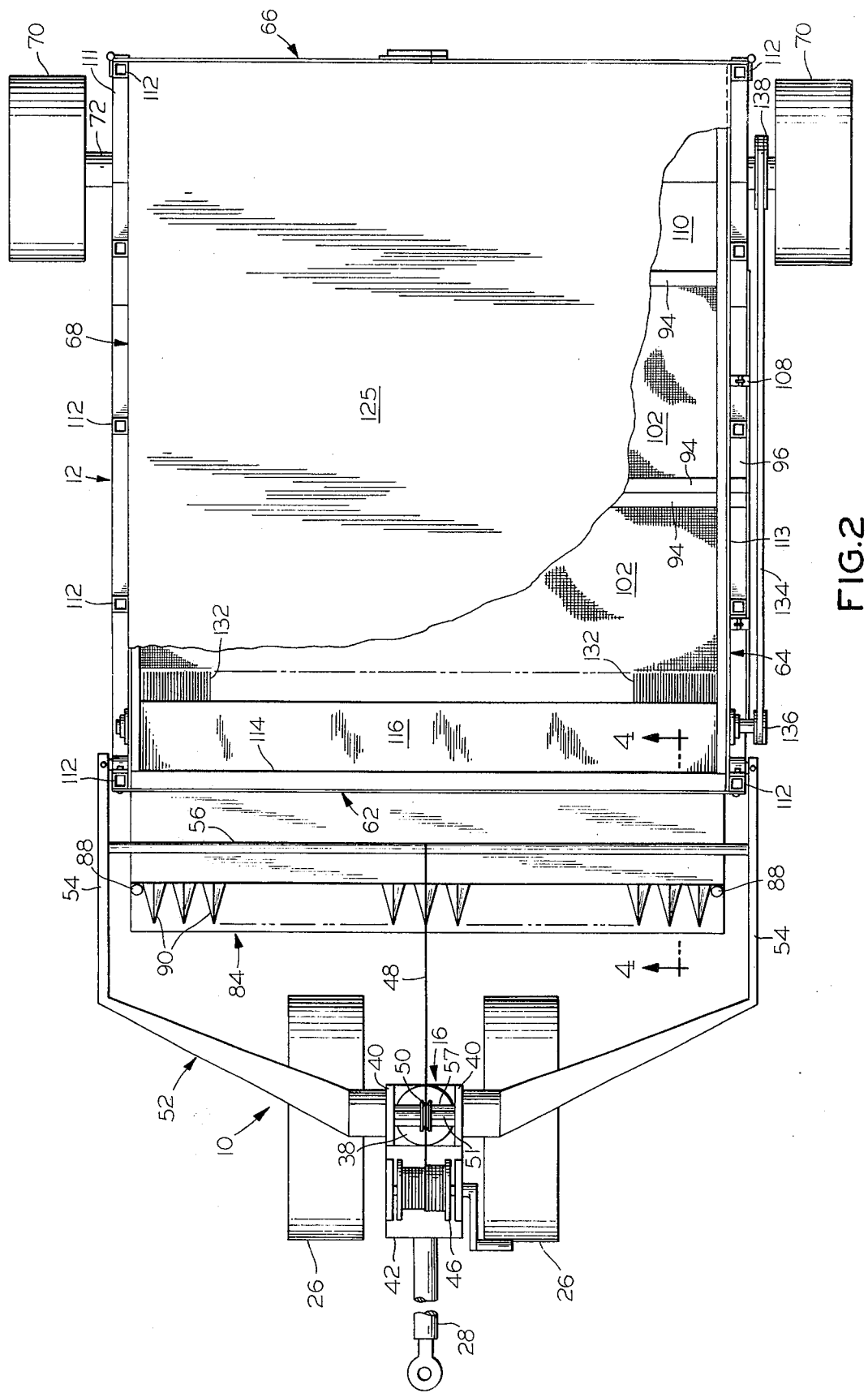
FIG. 2 is a plan view of the forward assembly and trailer member of the apparatus of FIG. 1 with the top cover of the trailer member broken away to show portions of the bed thereof.

As shown best in FIGS. 1 and 2, a pair of elongated rectangular vertical plate members 40 are welded to opposite sides of the sleeve member 38 and have a horizontal platform 42 and a pair of gussets 44 secured thereto and extending forwardly thereof. The platform 42 provides a mount for a conventional winch 46, the cable 48 thereof extending upwardly over a pulley 50 mounted on a shaft 51 extending between the upper ends of the plate members 40. The cable 48 is secured to an A-shaped yoke generally designated by the numeral 52 which is pivotably secured at its apex to the plate members 40.

With reference to FIG. 2, the yoke 52 consists of a pair of legs 54 each having two bends intermediate the length thereof and a cross piece 56 extending between the legs 54. As shown in FIGS. 1, 2, and 10, the yoke 52 is pivotably secured to the plate members 40 adjacent their longitudinal midpoints by a horizontal shaft 57 extending through the plate members 40 and into engagement with the legs 54 adjacent the apex of the yoke 52. The cable 48 is secured to the midpoint of the cross piece 56, the winch 46 thus being operative to effect pivotal movement of the yoke 52 and a raising and lowering of the free ends of the legs 54 thereof. With reference to FIGS. 1 and 6, the free ends of the legs 54 have notches 58 therein which facilitate detachably connecting the trailer member 12 thereto as described in more detail hereinafter.

The yoke 52 provides an operative interconnection between the forward assembly 10 and trailer member 12, the latter being formed primarily of square cross-sectioned tubular aluminum stock and sheet aluminum. The trailer member 12 comprises a rectangular bed generally designated by the numeral 60, four upstanding rectangular walls generally designated by the numerals 62, 64, 66, 68 secured to the bed 60 and/or adjacent walls, and a pair of wide wheels 70 mounted on an axle 72 rotatably mounted to and extending transversely of the rear portion of the bed 60.

As best seen in FIGS. 1 and 4, the forward portion of the bed 60 consists of a pair of hollow rectangular members 74, 76 formed of sheet material and secured together in generally coplanar relationship by fasteners 78 (only one is shown in FIG. 4.) The forward edge of the member 74 has a support member generally designated by the numeral 80 extending transversely intermediate the sheets thereof which has a forwardly projecting dovetail portion 82 along all but the end portions of its length. A solid triangularly cross-sectioned blade member generally designated by the numeral 84 has a slot 86 extending the length thereof cooperatively configured to recieve the dovetail portion 82, with pins 88 (see also FIG. 2) being inserted through the blade member 84 adjacent opposite ends of the dovetail portion 82 to lock the blade member 84 in position. Secured to the upper surface of the blade member 84 are a multiplicity of wedge-shaped members 90 the pointed ends of which are directed forwardly to facilitate breaking up clumped debris passing over the blade member 84.

The portion of the bed 60 extending rearwardly of the members 74, 76 is best shown in FIGS. 5–8 and consists of a pair of rectangular screen mounts generally designated by the numeral 92 each of which has three channel members 94 secured in a U-shaped configuration. The free ends of the channel members 94 are joined by vertically spaced elongated strips 96. Slidably seated in the channel members 94 are a pair of screen assemblies generally designated by the numeral 98 each of which consists of a rectangular frame formed of four elongated frame members 100 having spaced parallel screens 102, 104 secured to the upper and lower edge surfaces thereof. The upper screens 102 have a finer mesh than the lower screens 104.

As shown best in FIGS. 6 and 7, the screen assemblies 98 are retained in the screen mounts 92 by hinged retainer strips 106 extending across the openings intermediate the strips 96, with conventional hinged clasps 108 holding the retainer strips 106 in a closed position. Thus, the screen assemblies 98 are easily interchanged and conveniently retained within the screen mounts 92.

The portion of the bed 60 extending rearwardly of the screen mounts 92 includes a plate 110 secured along its forward edge to the rear screen mount 92 and having a bend intermediate its length directly above the axle 72. Square cross-sectioned tubular reinforcing struts 111 extend along and are secured to both upper lateral edge surfaces of the plate 110 to increase the strength thereof, both struts 111 being angled intermediate their lengths to conform to the configuration of the plate 110.

The side walls 64, 68 of the trailer member 12 each comprises five spaced vertical tubular posts 112 each of which has a square cross section and is secured to the periphery of the bed 60. Rectangular sheet-like wall members 113 are secured to the inner surfaces of the post 112 to complete the side walls 64, 68.

The front wall 62 comprises a rectangular sheet secured to the outer front surfaces of the two posts 112 disposed at the forward corners of the bed 60 and also to a horizontal strut 114 extending between these two posts 112 at a point spaced upwardly of the bed 60. As shown best in FIG. 6, the front wall 62 terminates upwardly of the bed 60 at the strut 114 and has an inwardly bent portion 116 extending inwardly of the trailer member 12 for a purpose described hereinafter. The rear wall 66 is best seen in FIG. 11 and comprises a pair of door hingedly mounted to the rear posts 112 and maintained in a closed position by a pair of conventional sliding bolt latches 120. The lower portion of the rear wall 66 includes a square cross-sectioned tubular member 121 and elongated rectangular plate 123 extending between and secured to the rear posts 112, the member 121 being secured also to the plate 110 and struts 111. A top cover 125 is secured to the upper edges of the walls 62, 64, 68.

The manner in which the yoke 52 is pivotably connected to the trailer member 12 is shown best in FIG. 6. Each of the forwardmost posts 112 has a C-shaped clamp secured to the rear surface thereof at a point spaced downwardly of the strut 114, each clamp 122 rotatably seating a stub shaft 124 which extends outwardly through the adjacent wall member 113. The exposed end of each shaft 124 is received by one of the notches 58 in the free ends of the legs 54 of the yoke 52, with pins 126 extending through apertures in the shafts 124 and legs 54 to releasably secure the yoke 52 and trailer member 12. The pins 126 are designed to shear when a predetermined force is exerted thereon for a purpose discussed hereinafter.

Also with reference to FIG. 6, a shaft 128 extends between and is rotatably secured to the side wall members 113 intermediate the reversely bent portion 116 and bed 60. Secured about the shaft 128 is a cylinder 130 having four radially extending brushes 132 spaced 90° thereabout and extending across the interior width of the trailer member 12. The brushes 132 are removable to facilitate replacement, and are dimensioned so that the outer longitudinal edges thereof contact the bed 60 and portion 116 during rotation of the shaft 128. The shaft 128 and brushes 132 are driven by an endless belt 134 extending around a pulley 136 secured to the shaft 128 and a pulley 138 secured to the axle 72. If so desired, an idler wheel or pulley (not shown) may be disposed along the belt 134 to provide a means for uncoupling the shaft 128 from rotating with the axle 72.

With reference to FIGS. 1 and 11, the bin member 14 consists of a sheet-like rectangular base 140, four walls two of which are generally designated by the numerals 142, 144 (the front wall and a lateral wall are not shown in the drawing figures), and a top cover 148. The lateral wall 142 comprises five spaced posts 150a,b,c,d,e having the same cross-sectional configuration as the posts 112, post 150c having a shorter length, with horizontal spacer bars 152 securing the posts 150 in parallel relationship. A generally U-shaped panel member is secured to the inner surfaces of the posts 150, and has an outwardly and downwardly opening door 156 hingedly secured thereto and extending between the posts 150b,d. A handle 157 facilitates opening the door 156, and any conventional means (not shown) may be used to maintain the door 156 in a closed position. The opposite lateral wall consists of five posts of equal length, suitable spacer bars, and a rectangular panel member.

The front wall (not shown) is a rectangular sheet secured to the rear surfaces of the post 150a and the corresponding post of the opposite lateral wall. The rear wall 146 has four rectangular doors 158 hingedly secured to the rear post 150e and the corresponding post of the opposite wall, with conventional sliding bolt latches 160 maintaining the doors 158 in a closed position. The bin member 14 is engaged with the trailer member 12 by ten square cross-sectioned connector bars 162 secured within and extending downwardly from each of the posts 150 and those posts of the bin member 14 not shown into the hollow posts 112 of the trailer member 12.

In operation the beach cleaning apparatus is designed to be towed by any available motorized vehicle. When the apparatus is to be towed without performing a cleaning function the trailer member 12 in is the position shown in solid lines in FIG. 1. To commence the cleaning operation the forward end of the trailer member 12 is lowered by means of the winch 46 so that the blade member 84 engages sand on the beach 164, this position being shown in phantom line in FIG. 1. As the apparatus is towed along the beach, sand and debris pass upwardly over the blade member 84 onto the members 74, 76 and are driven rearwardly onto the screen assemblies 98 by the rotating brushes 132 where they undergo a sifting action to remove debris with the sand falling back to the beach. As shown in FIG. 6, the inwardly bent portion 116 of the wall 62 effectively prevents objects being carried by the brushes 132 back out the forward end of the trailer member 12. The bed 60 is configured so that when sand is engaged the screen assemblies 98 are not inclined forwardly at such a steep angle that debris collects immediately behind the brushes 132. Any trash barrels (not shown) disposed on the beach may be emptied into the bin member 14 through the door 156. If the blade member 84 contacts a massive or anchored member the pins 126 will shear to uncouple the trailer member 12, thus preventing any severe damage to the blade member 84 or other elements of the apparatus.

Debris collected in the trailer member 12 and bin member 14 is removed therefrom by lifting the forward portion of the trailer member 12 to the position shown in FIG. 3. A rake or comparable tool may be used to facilitate removing debris from these two members.

The various elements of the beach cleaning apparatus are preferably configured and interconnected as described hereinbefore, but may have alternative configurations so long as the invention functions essentially as described. For example, the bed may be substantially planar although debris buildup behind the brushes may present a problem; the illustrated angled bed configuration provides relatively horizontal screen assemblies when the apparatus is disposed for cleaning sand, not the forwardly inclined disposition which would result if the bed were planar. Hydraulic lift means may be substituted for the winch if so desired, and the bin member may be eliminated if no waste receptacles are located on the beach. The configuration of the blade member may be changed so long as it presents a forward edge designed for cutting through sand.

Thus, it can be seen that the present invention provides a novel beach cleaning apparatus which is easily and relatively inexpensively manufactured and durable in operation. The elements of the invention which undergo the most wear are readily interchangeable, and the blade member and trailer member are automatically uncoupled from the drive vehicle upon contacting a massive or relatively immoveable object.

Having thus described the invention, I claim:

1. A beach cleaning apparatus comprising a forward assembly and a trailer member operatively connected thereto, said forward assembly comprising a body portion, means on the forward portion of said body portion for securing the beach cleaning apparatus to a motorized vehicle, and first rotatable means extending transversely of said body portion for rollably supporting said forward assembly on the ground; said trailer member comprising a bed comprising screen means adjacent the forward end thereof and having ground engaging means extending outwardly of said forward end, upstanding walls extending about the periphery of and mounted to said bed with the lower edge of the wall portion disposed adjacent said forward end of said bed beng spaced upwardly therefrom to provide a transversely extending opening, and second rotatable means extending transversely of the rear portion of said trailer member for rollably supporting said trailer member on the ground; and lift means operatively interconnecting the forward portion of said trailer member to said forward assembly for raising and lowering the forward portion of said trailer member to disengage and engage said ground engaging means with sand to be cleaned whereby engaged sand passes over said ground engaging means as the beach cleaning apparatus moves forwardly, through said opening and onto said screen means where it undergoes a sifting action to remove debris therefrom, the sand thereafter passing downwardly through said screen means onto a beach or the like.

2. The beach cleaning apparatus of claim 1 wherein said lift means comprises a vertical member extending upwardly from and mounted on said body portion intermediate the width thereof, elongated lever arm means pivotably mounted at one end thereof to said vertical member at a point spaced upwardly from said body portion for pivotal movement about a horizontal axis, elevating means on said forward assembly operatively connected to said lever arm means for effecting pivotal movement thereof, and securing means on the other end of said lever arm means for pivotably securing said other end of said lever arm means to said forward portion of said trailer member for relative pivotal movement about a horizontal axis.

3. The beach cleaning apparatus of claim 2 further including means rotatably mounting said vertical member on said body portion for rotation about a vertical axis.

4. The beach cleaning apparatus of claim 2 wherein said securing means includes force sensitive means releasably securing said other end of said lever arm means to said trailer member whereby said trailer member is disengaged from said lever arm means when said ground engaging means contacts a relatively massive or anchored member.

5. The beach cleaning apparatus of claim 1 further including third rotatable means extending transversely of said trailer member rearwardly of and adjacent said opening, the circumferential edges of said third rotatable means contacting said bed during rotation thereof whereby sand and debris passing through said opening is engaged by said third rotatable means and driven rearwardly thereof onto said screen means, and drive means for effecting rotation of said third rotatable means.

6. The beach cleaning apparatus of claim 5 wherein said drive means comprises belt means interconnecting said second rotatable means to said third rotatable means.

7. The beach cleaning apparatus of claim 1 further including door means in one of said walls of said trailer member.

8. The beach cleaning apparatus of claim 1 wherein said screen means comprises a rectangular screen member slidably seated in and extending between spaced parallel channel members in said bed.

9. The beach cleaning apparatus of claim 1 wherein said ground engaging means comprises a blade member generally coplanar with and releasably secured to the forward portion of said bed, said blade member extending across the width of said trailer member and tapering to a reduced vertical dimension at the forward end thereof.

10. The beach cleaning apparatus of claim 1 further including a bin member seated atop said trailer member comprising a solid base having the same peripheral configuration as the portion of said bed circumscribed by said walls, upstanding wall members extending about the periphery of said base, and means releasably coupling said bin member to said trailer member.

11. A beach cleaning apparatus comprising a forward assembly and a trailer member operatively connected thereto, said forward assembly comprising:
  A. a body portion;
  B. means on the forward portion of said body portion for securing the beach cleaning apparatus to a motorized vehicle;
  C. first rotatable means extending transversely of said body portion for rollably supporting said forward assembly on the ground;
  D. a vertical member extending upwardly from and mounted on said body portion intermediate the width thereof;
  E. elongated lever arm means pivotably mounted at one end thereof to said vertical member at a point spaced upwardly from said body portion for pivotal movement about a horizontal axis;
  F. mounting means at the other end of said lever arm means for pivotably securing said trailer member thereto for relative pivotal movement about a horizontal axis; and
  G. elevating means on said forward assembly operatively connected to said lever arm means for effecting pivotal movement thereof; said trailer member comprising:
  H. a rectangular bed comprising screen means adjacent the forward end thereof and having ground engaging means extending outwardly of said forward end;
  I. upstanding wall members extending about the periphery of and mounted to said bed with the lower edge of the wall member adjacent said forward end of said bed being spaced upwardly therefrom to provide a transversely extending opening;

J. second rotatable means extending transversely of the rear portion of said trailer member for rollably supporting said trailer member on the ground;

K. third rotatable means extending transversely of said trailer member rearwardly of and adjacent said opening, the circumferential edges of said third rotatable means contacting said bed during rotation thereof whereby sand and debris passing through said opening is engaged by said third rotatable means and driven rearwardly onto said screen means, and drive means for effecting rotation of said third rotatable means; and L. coupling means adjacent the forward end of said trailer member cooperating with said mounting means on said lever arm means to releasably secure said trailer member to said lever arm means.

* * * * *